United States Patent [19]

Kitsuda et al.

[11] 4,130,550

[45] Dec. 19, 1978

[54] PHENOL-FORMALDEHYDE COMPOSITION USEFUL AS A RAW MATERIAL FOR THE PREPARATION OF PHENOLIC RESINS

[75] Inventors: Yoshihiro Kitsuda; Takahisa Kouyama, both of Kadoma, Japan

[73] Assignee: Matsushita Electric Works, Ltd., Kadoma, Japan

[21] Appl. No.: 883,083

[22] Filed: Mar. 2, 1978

Related U.S. Application Data

[63] Continuation of Ser. No. 711,670, Aug. 4, 1976, abandoned.

[30] Foreign Application Priority Data

Aug. 4, 1975 [JP] Japan .................................. 50-95259
Aug. 7, 1975 [JP] Japan .................................. 50-96460

[51] Int. Cl.$^2$ .............................................. C08G 8/10
[52] U.S. Cl. .................................... 260/29.3; 528/140
[58] Field of Search ......................... 260/57 R, 57 C

[56] References Cited

U.S. PATENT DOCUMENTS

| | | | |
|---|---|---|---|
| 1,029,737 | 6/1912 | Aylsworth | 260/57 |
| 1,033,044 | 7/1912 | Aylsworth | 260/57 |
| 1,956,530 | 4/1934 | Granger | 260/57 |
| 2,190,672 | 2/1940 | Meharg | 260/57 |
| 2,288,533 | 6/1942 | Kreidl et al. | 260/57 |
| 2,383,430 | 8/1945 | Weltman | 260/57 |
| 2,437,981 | 3/1948 | Stephan et al. | 260/57 |
| 2,579,637 | 12/1951 | Weltman et al. | 260/29.3 |
| 3,006,893 | 10/1961 | West et al. | 260/57 |

*Primary Examiner*—Hosea E. Taylor
*Assistant Examiner*—E. A. Nielsen
*Attorney, Agent, or Firm*—Sughrue, Rothwell, Mion, Zinn and Macpeak

[57] ABSTRACT

A phenol-formaldehyde composition useful as a raw material for the preparation of phenolic resins, which comprises one or more phenols and not more than about 6 moles of formaldehyde per 1 mole of said one or more phenols, and, as optional components, not more than about 7 moles of water and not more than about 7 moles of methanol per 1 mole of said one or more phenols, the composition being obtained by dissolving formaldehyde into the one or more phenols, optionally with water or water plus methanol.

6 Claims, No Drawings

PHENOL-FORMALDEHYDE COMPOSITION USEFUL AS A RAW MATERIAL FOR THE PREPARATION OF PHENOLIC RESINS

This is a Continuation, of application Ser. No. 711,670, filed Aug. 4, 1976, and now abandoned.

BACKGROUND OF THE INVENTION

1. Field of the Invention

The present invention relates to a phenol-formaldehyde composition. More particularly, the present invention relates to a composition comprising phenols and formaldehyde used for the preparation of phenolic resins, which is obtained by dissolving and absorbing formaldehyde into phenols.

2. Description of the Prior Art

Heretofore, compositions consisting essentially of phenols and formaldehyde have not been known, and, of course, uses for such compositions have never been considered.

As examples of conventionally known compositions containing formaldehyde, there are 37% formaldehyde(formalin), highly concentrated formalin, solid paraformaldehyde and the like.

Formalin contains 37wt.% formaldehyde, about 8–10wt.% methanol and the balance water. If the concentration of formaldehyde is low or the methanol content is high, the reaction rate with phenols is poor, whereby a long period of time is required for reaction. Further, about 63wt.% of water and methanol does not participate in the reaction and is necessarily later removed.

Highly concentrated formalin contains 43–47wt.% $CH_2O$, and the $CH_2O$ concentration is larger as compared with the abovedescribed formalin. However, in order to prevent precipitation, methanol is further added so that the amount of methanol reaches 43–50wt.%. As a result, reaction with phenols is further slowed, thereby prolonging the reaction time and no advantages are obtained.

Paraformaldehyde is a solid material containing above 80wt.% of $CH_2O$ and below 1wt.% of methanol, and, in order to obtain such, an aqueous formaldehyde solution must be subjected to a dehydration treatment. Since such a dehydration is conducted at high temperatures, molecular weight increases, whereby extended periods of time are required to mix and dissolve the same with phenols. On the other hand, however, since the reaction rate is high, the reaction system becomes heterogenous, whereby a gelled resin is apt to be obtained. Further, since paraformaldehyde is not in the form of a liquid, it is disadvantageous in charging it for reaction.

Further, with respect to the preparation of phenolic resins (e.g., resols or novolaks), phenols and a 37% aqueous solution of formaldehyde (formalin) have heretofore been mixed, heated and reacted in the presence of a catalyst, and the resins thus obtained have been dehydrated. However such processes involve the following disadvantages:

(1) Since the concentration of a phenol-formaldehyde reaction system is low, conversion is low, and, as a result, a large amount of unreacted materials remain. Therefore, the resins obtained are not sufficiently satisfactory in their properties, such as their heat resistance or curing rate.

(2) At dehydration, a large amount of water must be removed and production efficiency is poor. Further, the content of unreacted materials must be controlled in the dehydration step.

(3) In the case of transporting raw materials to the factory, phenols and formaldehyde must be separately and individually transported. Further, since formalin is formed in the form of an aqueous solution and then transported, reacted and dehydrated, such is very disadvantageous from the economical point of view.

On the other hand, in order to overcome the disadvantages of dehydration involved in conventional techniques, the direct reaction of phenols and formaldehyde polymers has been attempted, but, in such a case, the formaldehyde polymers do not easily dissolve in phenols, and in the case of trying to dissolve the same by heating, the thermal decomposition heat and the dissolution heat of formaldehyde and the reaction heat of phenols with formaldehyde are simultaneously generated, and, as a result, control of the reaction temperature is difficult, whereby the resins are gelated. Further, the properties of the resins obtained are poor in that gas generation at curing is large, heat resistance is poor, removal from a mold at molding cannot be smoothly conducted, etc.

Further, conventional resols are insoluble in water and are used in the form of varnish which is dissolved in organic solvents such as methanol, ethanol, benzene, toluene and xylene. However, organic solvents are generally inflammable and sometimes toxic. Thus, there are various disadvantages.

Heretofore, water-soluble resols have been prepared by reacting phenol and formalin in a highly alkaline environment (about pH 11) using caustic soda. However, due to residual catalysts in the resin, properties such as the insulation resistance after boiling in water are remarkably poor, and, as a result, it cannot be used as a resin for laminated boards and is merely used as an adhesive for plywood.

Further, in the case of preparing a resin for laminated plates, formalin is generally used within the pH range of 8 to 10, but, in such a case, a large amount of water is present in the reaction system, whereby the concentration of formaldehyde in the reaction system becomes low and the methylolation reaction is slow. Therefore, in order to increase the conversion of formaldehyde to above 65% (in case of it being below 65%, unreacted materials increase and yield is poor), a long reaction time is required, and since methylation proceeds during such a period of time, the resols obtained have a wide molecular weight distribution, i.e., have a large amount of methylolated polynuclear compounds. Therefore, resols having low affinity with water, i.e., low water-miscibility, are merely obtained and it is difficult to form water-soluble resols.

For this reason, in the case of using resols for laminated plates as a varnish, where they are diluted using only water to adjust the viscosity thereof, the varnish becomes turbid whereby uniform varnishes cannot be obtained. Therefore, it is unavoidable to use organic solvents such as methanol. Organic solvents are removed by evaporation in a drying step after an immersion step, but such is not preferred from the viewpoint of costs of venting treatment or the like. Further, there is the danger of explosion in the drying step.

Thus, if resols could be water-solubilized, it can be expected that varnishes in which water is used as a solvent could be obtained, it would not be necessary to use expensive organic solvents, there would be no danger of explosion and production capability could be increased by using elevated drying temperatures.

On the other hand, it has been considered to increase reaction rate using paraformaldehyde having a purity of above 80%. In such a case, since methylolation is very vigorous in the reaction in the presence of an alkali catalyst (pH above 8.0), it is impossible to produce stable resols because it is difficult to control the reaction temperature, side-reactions occur, or bumping or gelation is caused.

SUMMARY OF THE INVENTION

The present invention overcomes the above disadvantages and provides a composition useful as a raw material for the preparation of phenol-formaldehyde resins.

Where the composition according to the present invention is used for the preparation of phenolic resins, the following characteristics can be obtained.

(1) The transportation cost of raw materials is extremely low.

(2) The composition can be subjected to reaction immediately after adding an appropriate catalyst, with or without controlling the component ratio of phenols and formaldehyde in the composition.

(3) Where the composition is subjected to reaction, reaction control is easy and conversion is high.

(4) Dehydration after reaction is unnecessary or, if necessary, is easily conducted, and, as a result, production costs are low. Further, the reaction time is short.

(5) The composition has excellent storage stability.

Thus, it is an object of the present invention to provide a composition comprising phenols and formaldehyde useful for the preparation of phenolic resins.

The above objects of the present invention are reached by a composition which consists essentially of one or more phenols and from about 0.5 to about 5 moles, per 1 mole of said phenol or phenols, of formaldehyde.

The present invention further provides a process for preparing phenolic resins which comprises reacting one or more phenols with formaldehyde in the presence of a catalyst, the reactants being obtained from a composition comprising one or more phenols and not more than 6 moles of formaldehyde per 1 mole of said one or more phenols which is prepared by dissolving formaldehyde into said one or more phenols.

DETAILED DESCRIPTION OF THE INVENTION

The phenols which constitute the composition of the present invention are not specifically limited and one or more of any phenol (hereafter often merely "phenols") usable as a raw material for phenolic resins which are prepared by reaction with formaldehyde can be used. Examples of the phenols include phenol, cresols, xylenol, alkyl phenols such as ethyl phenol, propyl phenol, hexyl phenol, nonyl phenol or cashew nut shell liquid, alkenyl phenols such as isopropenyl phenol, polyhydric phenols such as resorcin, or the like. Of these, phenols having a melting point of not higher than about 50° C. are preferred in view of the subsequent treatment of absorbing formaldehyde. No limitation is posed on the purity of the phenols so long as there is no problem in the preparation of phenolic resins. The phenols may contain any desired solvent. The phenols may be used singly or as mixtures thereof.

The formaldehyde used in the present invention can be supplied in the form of a gas, liquid or mixture thereof, and is preferably in the form of gas. It was considered to use paraformaldehyde, etc., but such does not meet the features of the present invention.

Formaldehyde is generally obtained by the thermal decomposition of paraformaldehyde, the air-oxidation of methanol, the dehydrogenation of methanol, the thermal decomposition of hemi-acetal, or the like. The preparation manners of the formaldehyde is not limited and formaldehyde obtained in any manner can be utilized in the present invention. In general, no limitation is posed on the purity of the formaldehyde if no problems are encountered in the preparation of phenolic resins. The formaldehyde may contain gases such as oxygen, nitrogen, hydrogen, carbon dioxide, carbon monoxide, etc., for example, impurities or dilute gas.

In general, though the invention is not to be limited to this, the composition of the present invention is prepared by preparing phenols in a liquid state, introducing formaldehyde therein and absorbing and dissolving the same therein. There is, in principle, no limitation on the means, apparatus, manner, conditions, etc., used for the above operations. The main object of the present invention is to provide a composition comprising phenols and formaldehyde, and so long as such a composition can be obtained, there are no limitations on the preparation thereof.

However, there will now be described a preferred embodiment of introducing formaldehyde into phenols.

The phenols are prepared in liquid form and maintained at an appropriate temperature. Then, formaldehyde is introduced into the phenols to absorb and dissolve the same therein. In the case of absorbing and dissolving formaldehyde, about 40° to about 100° C. is preferred as the temperature of the phenols, but it is desirable to operate at the low temperature side within the above range to an extent of not causing a polymerization of formaldehyde or a solidification of the phenols. In such a composition, formaldehyde is present in an amount of not more than about 6 moles, preferably from 0.5 to 5 moles, even more preferably 0.5 to 3 moles, per 1 mole of phenols.

The pressure of the absorption (or dissolution) can vary widely, but typically it is conducted at atmospheric pressure. The general rule, in this regard, is that no substantial benefits are achieved by using sub-atmospheric pressures for the absorption, in fact, absorption times are increased, and while absorption rate can often be increased by operation at super atmospheric pressures, generally the more complicated apparatus necessary to operate at super atmospheric pressure renders operation at super atmospheric pressure unprofitable.

The composition according to the present invention can contain water, or water and methanol as optional components. The reason for the presence of such components is to obtain good storage stability of the composition. Specifically, the copresence of water and methanol provides excellent storage stability. For example, the composition composed of phenols and formaldehyde becomes turbid at room temperature even though the turbidity may be removed by heating the composition to, for example, above about 50° C., but a composition composed of phenols, formaldehyde and water or water and methanol is a transparent liquid even at room temperature.

A composition comprising phenols, formaldehyde and water can be obtained in the same manner as mentioned before. In such a case, water (which is one component of the composition) may be mixed with phenols or be co-present in formaldehyde or be added to the composition obtained by absorbing and dissolving formaldehyde into phenols. The most preferred manner is to employ a mixture of formaldehyde and water, which is obtained in the case of oxidizing methanol by using air in excess (see "The Oxide Catalyst Process", G. F. Walker "Formaldehyde", page 9, 1964) to obtain formaldehyde, and absorb and dissolve the same in phenols. It is preferred in such a composition that water be present in an amount of not more than about 7 moles, more preferably from 0.05 to 4 moles, per 1 mole of phenols.

The composition comprising phenols, formaldehyde, water and methanol can be also obtained in the same manner as mentioned before. In such a case, methanol and water may be mixed previously in phenols or formaldehyde or may be added to a composition obtained by absorbing and dissolving formaldehyde into phenols. It is preferred in such a composition that water be present in an amount of not more than about 7 moles, more preferably from 0.05 to 4 moles, per 1 mole of phenols, and methanol be present in an amount of not more than about 7 moles, more preferably from 0.05 to 4 moles, per 1 mole of phenols.

In view of the object of the present invention, it is most preferred to use a mixture of formaldehyde, water and methanol obtained by a dehydrogenation using insufficient air (see "The Silver Catalyst Process", G. F. Walker "Formaldehyde", page 21, 1964). Such a mixture which is soluble in phenols generally contains 40 to 80wt.% formaldehyde, 10 to 30wt.% water and 10 to 30wt.% methanol, and even if such a mixture is directly absorbed and dissolved in phenols, the desired composition of the present invention can be easily obtained.

In order to control the content of water and methanol in the composition, the following procedures are employed.

(1) A composition obtained by absorbing and dissolving formaldehyde, water and methanol into phenols is subjected to a distillation. In such an operation, methanol removal and/or dehydration is/are conducted to obtain a composition having the desired components. Distillation is not limited to any specific procedure, and reduced pressure distillation, pressure distillation, normal pressure distillation, refining, etc., can be employed. However, reduced pressure distillation, normal pressure distillation and refining are most preferred. It is impossible to remove all methanol by such distillations. This is considered to be due to the fact that hemi-acetal is formed in the composition (solution). However, the co-presence of methanol in an appropriate amount is rather preferred from the viewpoint of increasing storage stability of the composition.

(2) A mixture (40 to 80wt.% formaldehyde; 10 to 30wt.% water; 10 to 30wt.% methanol) obtained by dehydrogenation using insufficient air is condensed, for example, by absorption into water, and is then subjected to distillation as mentioned in 1) above to obtain a composition of 50 to 80wt.% formaldehyde, not more than 3wt.% methanol, remainder being water or other impurities. The resulting composition is absorbed and dissolved in phenols to obtain a composition having the desired component ranges.

In any event, it is preferred that the composition obtained by procedure 1) or 2) above have a composition as follows: not more than about 6 moles, preferably from 0.5 to 5 moles, more preferably from 0.5 to 3 moles, of formaldehyde, not more than about 7 moles, preferably from 0.05 to 4 moles of water, and not more than 7 moles, preferably from 0.05 to 4 moles of methanol, per 1 mole of phenols.

The composition comprising formaldehyde and phenols and optionally water, or water and methanol may be prepared in any conventional manner, but it is preferred to employ the procedure of introducing a mixture containing formaldehyde obtained by the air-oxidation of methanol into phenols.

Phenolic resins including resols and novolaks can be prepared from the compositions according to the present invention in the same manner as is employed in the conventional reaction of phenols and formalin, i.e., by reacting the compositions in the presence of an appropriate catalyst. The foregoing compositions are especially useful as raw materials for the preparation of phenolic resins and bisphenol type epoxy resins.

If the formaldehyde/phenols molar ratio is smaller than 0.5, cross-linking density during a curing stage is lacking whereby curing cannot be completely conducted, while, on the contrary, if the formaldehyde/phenols molar ratio exceeds 5, it is apt to cause gelation. A formaldehyde/phenols molar ratio within the range of from 0.5 to 3 is preferred in order to completely prevent gelation. Further, if amount of other components is smaller than the lower limit thereof, the balance of the methylolation rate and the methyllation rate is lost and desired phenolic resins cannot be obtained, and if larger than the upper limit, the reaction proceeds slowly since methanol acts as a reaction retarder, whereby the reaction time becomes long.

With respect to the reaction conditions for forming such phenolic resins, and such is not limitative, it is preferred to conduct the reaction at temperatures of from 70° to 110° C. If the reaction temperature is lower than 70° C., the reaction proceeds too slow and is not practical, while if the reaction temperature is higher than 110° C., the reaction proceeds too vigorously. The reaction time is generally 60 to 300 hrs, though such varies depending upon the charging conditions. The reaction is conveniently preformed at atmospheric pressure, though sub- and super-atmospheric pressures can be utilized, if desired.

As a reaction catalyst, there can be used any acidic, neutral or alkali catalyst as is widely and conventionally used in the preparation of phenolic resins. Examples of acidic catalysts include hydrochloric acid, sulfuric acid, oxalic acid, phosphoric acid, p-toluenesulfonic acid or the like. Examples of neutral catalysts include zinc acetate, manganese acetate or the like. Examples of alkali catalysts include caustic alkalis (e.g. caustic soda, caustic potash), sodium carbonate, organic amines or the like.

The pH of reaction is dependent upon the kind of catalyst used, and in the case of using a neutral or acidic catalyst, the reaction is conducted at a pH of from 1 to 6, while in the case of using a neutral or alkali catalyst, the reaction is conducted at a pH of from 7.5 to 11. The catalyst is used in an amount so as to adjust the pH of the reaction system to the desired range.

As is conventionally known, there is a close relationship between the formaldehyde/phenols molar ratio in the starting composition, the kind of catalyst used (i.e., the pH range) and the type of resin finally obtained. The same fact is encountered in the preparation of phenolic resins using the starting composition according to the present invention. That is to say, in the case of conducting the reaction of a composition having a formaldehyde/phenols molar ratio of not less than 1 in the presence of neutral or alkali catalysts at a pH of from 7.5 to 11, resols (viscous liquid) are obtained. On the other hand, in the case of conducting the reaction of a composition having a formaldehyde/phenols molar ratio of not less than 1 in the presence of neutral or acidic catalysts at a pH of from 1 to 6, novolaks (solid) are obtained.

Further, in the case of preparing water-soluble resols using the composition of the present invention, which is a very important feature of the present invention, reaction is conducted in the presence of calcium hydroxide and/or barium hydroxide at a pH of from 7.5 to 9, preferably from 8.0 to 8.5. Laminates prepared using the resulting water-soluble resols thus obtained show excellent water-resistance, specifically, resistance to boiling water.

Before being subjected to reaction, the composition comprising formaldehyde and phenols used for the preparation of phenolic resins according to the present invention may be diluted with water to control the formaldehyde/phenols ratio to a suitable and desired ratio.

Further, after reaction, the reaction product may be neutralized with an acid or an alkali in a conventional manner.

Furthermore, after neutralization, desalting may be conducted in a conventional manner.

The phenolic resins obtained using the composition according to the present invention can be widely used as, for example, a varnish for the preparation of laminated plates, an adhesive for plywood, as materials for molding or the like.

The following Examples are given to further illustrate the present invention in detail but the invention is not to be construed as being limited thereby.

PREPARATION EXAMPLE 1

100 ml of liquid paraffin was charged into a 2 liter three-necked flask and nitrogen gas was passed therethrough at a feed rate of 0.5 l/min. while heating at 150°–180° C. A mixture of 90 g of paraformaldehyde powder and 150 g of liquid paraffin was gradually added dropwise to the flask over 45 min. Gas generated therein was taken into a 200 ml flask in which 94 g of phenol was filled at 95° C. and was absorbed therein for 60 min. The weight increase of the composition obtained was 22 g, and, as result of $CH_2O$ analysis by the hydrochloric acid-hydroxylamine method, the molar ratio of formaldehyde/phenol was 0.7.

The composition obtained was allowed to stand for 7 days at room temperature; the composition remained homogeneous and no change was observed with respect to the $CH_2O$ component.

PREPARATION EXAMPLE 2

Formaldehyde gas generated in the same manner as in Example 1 was taken into a 200 ml flask in which 94 g of phenol was filled at 95° C. and absorbed therein for 150 min. During absorption, no specific vigorous heat absorption or generation was observed. The weight increase of the composition obtained was 61 g, and, as a result of $CH_2O$ analysis as in Example 1, the molar ratio of formaldehyde/phenol was 2.0.

The composition obtained was a homogeneous solution at temperatures above about 35° C. and whitened at temperatures lower than about 35° C., but when heated to above 50° C., a uniform, transparent solution was obtained.

Further, the composition was allowed to stand for 7 days at room temperature, but no change of the components was observed.

PREPARATION EXAMPLE 3

100 ml of liquid paraffin was charged into a 2 l three-necked flask, and nitrogen gas was passed therethrough while heating at 150°–180° C. at a feed rate of 0.5 l/min. A mixture of 100 g of paraformaldehyde powder and 60 g of water was then gradually added dropwise to the flask over 120 min. Gas generated therein was taken into a 200 ml flask which contained 94 g of phenol at 95° C. and was absorbed for 160 min.

The composition obtained contained 3.01 moles of formaldehyde and 3.3 moles water per 1 mole of phenol.

The composition was allowed to stand for 3 days at room temperature and maintained its homogeneity; no change of the components was observed.

PREPARATION EXAMPLE 4

A composition was obtained in the same manner as in Example 3 except that a mixture of 100 g of paraformaldehyde and 30 g of water was used, and absorption was conducted for 170 min.

The composition obtained contained 2.5 moles formaldehyde and 1.6 moles of water per 1 mole of phenol.

The composition was allowed to stand for more than 2 days; it maintained its stability, and no change of the components was observed.

PREPARATION EXAMPLE 5

Formaldehyde gas was generated in the same manner as in Example 3 and steam was mixed therewith to obtain a mixed gas of 80wt.% $CH_2O$ and 20wt.% $H_2O$. The mixed gas was introduced into phenol for 170 min. and absorbed and dissolved in the same manner as in Preparation Example 3.

The composition obtained contained 4.5 moles of formaldehyde and 1.88 moles of water per 1 mole of phenol.

The composition was stable over one night and one day, and no change of components was observed.

PREPARATION EXAMPLE 6

Into a copper tube reactor (diameter: 55 mm) were supplied 1.2 kg/hr of methanol and 12.4 m³/hr of air (air/methanol ratio (l/g) = 10.3), and reaction was conducted at 350° C. in the presence of 40 g of $MoO_3$ catalyst to obtain a mixed gas of formaldehyde and water (62.5wt.% $CH_2O$ and 37.5wt.% $H_2O$).

The mixed gas obtained was introduced into 94 g of phenol charged in a 200 ml flask (at 95° C.) and absorbed therein for 170 min. During absorption, no specific rapid heat absorption or generation was observed.

The composition obtained contained 2.5 moles of formaldehyde and 2.5 moles of water per 1 mole of phenol.

The composition was allowed to stand for more than one week at room temperature but no change occurred. Further, after allowing it to stand for 3 dauys at room temperature, no change of the components was observed.

PREPARATION EXAMPLE 7

A composition was obtained in the same manner as in Preparation Example 3 except that a mixture of 110 g of paraformaldehyde powder, 44 g of water and 22 g of methanol was gradually added thereto dropwise. The weight increase of the composition obtained was 158 g, and, as a result of $CH_2O$ analysis by the hydrochloric acid-hydroxylamine method, it was confirmed that 3.28 moles of formaldehyde, 0.69 mole of water and 2.1 moles of methanol per 1 mole of phenol were present.

The composition obtained was allowed to stand for more than 4 days at room temperature, and no whitening and solidification occurred; further, no change of the components was observed.

PREPARATION EXAMPLE 8

A composition was obtained in the same manner as in Preparation Example 7 except that 26 g of water was used. The weight increase of the composition obtained was 170 g. The composition had 3.5 moles of formaldehyde, 1.17 moles of water and 1.38 moles of methanol per 1 mole of phenol.

The composition obtained was allowed to stand 3 days at room temperature; it maintained its stability and no change of the components was observed.

PREPARATION EXAMPLE 9

Into a copper tube reactor (diameter: 35 mm) were supplied 5.0 kg/hr of methanol and 4.43 m$^3$/hr of air (air/methanol ratio (l/g) = 0.88), and reaction was conducted at 601° C. in the presence of a cylindrical silver net catalyst (diameter of the silver wire: 0.22 mm; diameter of the cylinder: 0.5 mm; length of the cylinder: 150 mm) to obtain a liquid having 53wt.% formaldehyde, 37wt.% water and 10wt.% methanol. The liquid obtained was condensed to obtain a liquid having 80wt.% formaldehyde, 10wt.% water and 10wt.% methanol. The resulting liquid was mixed with phenol heated at 50° C. to obtain a composition containing 5.5 moles of formaldehyde, 1.11 moles of water and 0.63 mole of methanol per 1 mole of phenol.

The composition was allowed to stand for more than 10 hrs at room temperature; it maintained its stability and no change of the components was observed.

PREPARATION EXAMPLE 10

The liquid obtained in Preparation Example 9 was mixed with phenol heated at 50° C. to obtain a composition containing 1 mole of phenol, 5.5 moles of formaldehyde, 1.11 moles of water and 0.63 mole of methanol.

500 g of the composition (solution) obtained was distilled at a temperature of 50°-52° C. at a pressure of 200 mmHg for 27 min. to eliminate 34 g of a 55wt.% aqueous methanol solution. The composition after distillation contained 5.5 moles of formaldehyde, 0.6 mole of water and 0.28 mole of methanol per 1 mole of phenol.

PREPARATION EXAMPLE 11

300 g of the solution obtained in Preparation Example 10 was distilled at 103° C. at atmospheric pressure for 67 min. to eliminate 14.2 g of a 55wt.% aqueous methanol solution. The composition after distillation contained 5.5 moles of formaldehyde, 0.77 mole of water and 0.38 mole of methanol per 1 mole of phenol.

PREPARATION EXAMPLE 12

Into the same tube reactor as was used in Preparation Example 9 were supplied 5.0 kg/hr of methanol and 1.35 m$^3$/hr of air (air/methanol ratio (l/g) = 0.26) and reaction was conducted at 420° C. in the presence of the same catalyst as was used in Preparation Example 9 to obtain a liquid having 49wt.% formaldehyde, 12wt.% methanol and 39wt.% water. The liquid obtained was condensed to obtain a liquid having 70wt.% formaldehyde, 10wt.% water and 20wt.% methanol. The liquid was mixed with m-cresol heated at 55° C. to obtain a composition containing 4.0 moles of formaldehyde, 0.55 mole of water and 1.05 moles of methanol per 1 mole of m-cresol.

237 g of the composition (solution) was distilled at 52°-57° C. at 200 mmHg for 30 min. to eliminate 19 g of a 55 wt.% aqueous methanol solution. The composition after distillation contained 4.0 moles of formaldehyde, 0.05 mole of water and 0.72 mole of methanol per 1 mole of m-cresol.

PREPARATION EXAMPLE 13

500 g of the liquid (before condensation) as was obtained in Preparation Example 9 was distilled at 52°-60° C. at 200 mmHg for 20 min. to eliminate 60 g of a 67% aqueous methanol solution. The composition after distillation contained 60wt.% formaldehyde, 3wt.% methanol and 37wt.% water.

100 g of composition was mixed with 1 mole of phenol at 50° C. to obtain a transparent solution (composition).

PREPARATION EXAMPLE 14

200 g of the liquid composition obtained in Preparation Example 13 was distilled at 86°-103° C. at atmospheric pressure for 50 min. to eliminate 24.8 g of a 68% aqueous methanol solution. The composition after distillation contained 65wt.% formaldehyde, 2wt.% methanol and 33wt.% water. 100 g of the composition obtained was mixed with 1 mole of phenol to obtain a transparent solution.

PREPARATION EXAMPLE 15

Into a copper tube reactor (diameter: 35 mm) were supplied 1.2 kg/hr of methanol and 1.156 m$^2$/hr of air (air/methanol ratio (l/g) = 0.963), and reaction was conducted at 560° C. in the presence of circular copper net catalyst (diameter of the copper wire: 0.2 mm, diameter of the net: 0.83 mm) to obtain a gas.

The resulting gas was absorbed in water to obtain a liquid composition having 50wt.% formaldehyde, 20wt.% water and 30wt.% methanol.

100 g of the solution obtained was distilled at 103° C. at atmospheric pressure for 15 min. to eliminate 27 g of a 56% aqueous methanol solution. The composition after distillation contained 68.5wt.% formaldehyde, 11wt.% methanol and 20.5wt.% water.

100 g of the solution (composition) obtained was mixed with 1 mole of m-cresol to obtain a liquid composition.

EXAMPLE 1

Into a reaction vessel equipped with a stirrer, a reflux condenser and a thermometer were charged 474 parts by weight of a phenol-formaldehyde composition (formaldehyde/phenol=2(in molar ratio); water/phenol=3.13 (in molar ratio)) and 26 parts by weight of phenol to adjust the formaldehyde/phenol molar ratio to 1.78. Calcium hydroxide (catalyst) was added thereto to adjust the pH of reaction system to 8.5.

Reaction was conducted at 100° C. for 50 min. to obtain a resol resin.

The resin obtained was diluted with water and impregnated into a linter paper having a weight of 100 g/m$^2$. Ten sheets of the impregnated papers (prepregs) were superposed and pressed at 150° C. under 100 Kg/cm$^2$ to obtain a laminate.

The laminate obtained was excellent in its resistance to boiling water and showed almost no weight change.

EXAMPLE 2

The procedures of Example 1 were repeated in the same manner except that barium hydroxide was used instead of calcium hydroxide.

The laminate obtained was excellent in its resistance to boiling water and showed no weight change.

EXAMPLE 3

252 parts by weight of the m-cresol-formaldehyde composition obtained in Preparation Example 12 and 108 parts by weight of m-cresol were charged into the same reaction vessel as used in Example 1 to adjust the formaldehyde/m-cresol molar ratio to 2.0. Sodium hydroxide was added as a catalyst to the vessel to adjust the pH of the reaction system to 9.0.

Reaction was conducted at 100° C. for 60 min. to obtain a resol.

Using the resol obtained, a laminate was prepared in the same manner as in Example 1.

The laminate was excellent in its resistance to boiling water and showed almost no weight change.

COMPARATIVE EXAMPLE 1

188 parts by weight of phenol and 289 parts by weight of 37% formalin were charged into the same reaction vessel as was used in Example 1 to adjust the formaldehyde/phenol molar ratio to 1.78. Calcium hydroxide was added to adjust the pH to 8.5.

Reaction was conducted at 100° C. for 120 min. The reaction mixture was then dehydrated at 600 mmHg for 60 min. to eliminate 130 parts by weight of a dehydrated waste solution to obtain a resin.

Using the resin, a laminate was prepared as in the same manner as in Example 1.

COMPARATIVE EXAMPLE 2

94 parts by weight of phenol and 66.8 parts by weight of 80% paraformaldehyde were charged into the same reaction vessel as was used in Example 1 to adjust the formaldehyde/phenol molar ratio to 1.78. Barium hydroxide was added thereto to adjust the pH of the reaction system to 8.5.

Reaction was initiated at 100° C., but, after 10 min., gelation occurred due to rapid heat generation.

COMPARATIVE EXAMPLE 3

216 g of m-cresol and 324 g of 37% formaldehyde (formalin) (formaldehyde/m-cresol = 2 (in molar ratio), water/formaldehyde = 0.6 (in weight ratio)) were charged into the same reaction vessel as was used in Example 1 to control the formaldehyde/m-cresol molar ratio to 2.0. Then, sodium hydroxide was added thereto to adjust the pH of reaction system to 9.0.

Reaction was conducted at 100° C. for 120 min. Then, the reaction mixture was dehydrated at 520 mmHg for 60 min. to eliminate 150 parts by weight of dehydrated waste solution to obtain a resin.

Using the resin obtained, a laminate was prepared in the same manner as in Example 1.

The results obtained in Examples 1 to 3 and Comparative Examples 1 to 3 are set forth in the following Table.

TABLE

| | Example 1 | Example 2 | Example 3 | Comparative Example 1 | Comparative Example 2 | Comparative Example 3 |
|---|---|---|---|---|---|---|
| Conversion of Phenol or m-Cresol (mol%) | 80.3 | 81.2 | 79.3 | 78.5 | — | 80.4 |
| Conversion of Formaldehyde (mol%) | 80.0 | 82.2 | 80.6 | 70.6 | — | 78.0 |
| Miscibility*[1] | 190 | 220 | 10 | 41 | — | 0 |
| Viscosity (cps) (at 30° C) | 150 | 120 | 140 | 120 | See Note*[4] | 280 |
| Properties of Laminate Resistance to Boiling Water (hrs)*[2] | >18 | >18 | >18 | 5 | — | 9 |
| Size Change*[3] (%) Longitudinal Direction | 0.13 | 0.20 | 0.18 | 0.62 | — | 0.68 |
| Horizontal Direction | 0.35 | 0.41 | 0.33 | 0.88 | — | 0.96 |

Notes:
*[1] Amount of water (ml) at the time that water is added to 100 parts by weight of resin and turbidity appears (at 30° C).
*[2] Time (hrs) until swelling caused by immersing the laminate into boiling water.
*[3] According to JIS K-6903
*[4] Measurement impossible due to occurrence of gelation in Comparative Example 2.

EXAMPLE 4

Into the same reaction vessel as was used in Example 1 were charged 76.5 g of phenol and 132.1 g of mixture of phenol, formaldehyde, methanol and water (formaldehyde/phenol molar ratio = 1.8; methanol/phenol molar ratio = 0.12; water/phenol molar ratio = 19.6). Then, 0.6 g of (COOH)$_2$ was added thereto and the mixture was heated to 98° C. over about 40 min. while stirring, and then further stirred for 120 min. at 98° C. Thereafter, the reaction mixture was dehydrated at 520 mmHg for 75 min. to eliminate 52.2 g of a dehydrated waste solution and to obtain 153.5 g of a pale yellow resin.

| | |
|---|---|
| Conversion of formaldehyde (%) | 99 |

-continued

| Conversion of phenol (%) | 90 |
| Softening point of resin obtained (° C) | 96.3 |

COMPARATIVE EXAMPLE 4

Into the same reaction vessel as was used in Example 1 were charged 106 g of phenol and 74.3 g of 37% formalin. Then, 0.45 g of $(COOH)_2$ was added thereto and reaction conducted at 98° C. for 200 min.

The reaction mixture was dehydrated at 520 mmHg for 180 min. to eliminate 63 g of a dehydrated waste solution and obtain 115 g of resin.

| Conversion of formaldehyde (%) | 98 |
| Conversion of phenol (%) | 90 |
| Softening point of resin obtained (° C) | 98 |

While the invention has been described in detail and with reference to specific embodiments thereof, it will be apparent to one skilled in the art that various changes and modifications can be made therein without departing from the spirit and scope thereof.

What is claimed is:

1. A process for preparing water-soluble resols which comprises carrying out a reaction to form resols in a composition comprising, as a main component, one or more phenols, about 1 to about 3 moles per 1 mole of said one or more phenols of formaldehyde and about 0.05 to about 4 moles per 1 mole or said one or more phenols of water in the presence of calcium hydroxide and/or barium hydroxide at a pH of 7.5 to 9.

2. The process of claim 1 wherein the pH is from 8.0 to 8.5.

3. The process of claim 1 wherein the reaction is carried out at a temperature of from 70° to 110° C.

4. The process of claim 1 wherein the reaction is carried out at atmospheric pressure.

5. The process of claim 1 wherein calcium hydroxide is only used.

6. The process of claim 1 wherein barium hydroxide is only used.

* * * * *

UNITED STATES PATENT AND TRADEMARK OFFICE
CERTIFICATE OF CORRECTION

PATENT NO. : 4,130,550
DATED : December 19, 1978
INVENTOR(S) : Yoshihiro KITSUDA, Takahisa KOUYAMA It is certified that error appears in the above-identified patent and that said Letters Patent are hereby corrected as shown below:

Under FOREIGN APPLICATION PRIORITY DATA:

Add - August 8, 1975...............96975/75

Add - March 31, 1976...............36628/76

Signed and Sealed this

Tenth Day of April 1979

[SEAL]

Attest:

RUTH C. MASON
*Attesting Officer*

DONALD W. BANNER
*Commissioner of Patents and Trademarks*